United States Patent
Chen et al.

(10) Patent No.: US 7,809,479 B2
(45) Date of Patent: *Oct. 5, 2010

(54) NAVIGATIONAL SYSTEM WITH A GRAPHICAL SCRATCHPAD FILLER

(75) Inventors: Sherwin S Chen, Bellevue, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,200

(22) Filed: Dec. 2, 2009

(65) Prior Publication Data
US 2010/0082236 A1 Apr. 1, 2010

Related U.S. Application Data

(62) Division of application No. 11/069,420, filed on Feb. 28, 2005, now Pat. No. 7,693,615.

(51) Int. Cl.
G06F 17/00 (2006.01)
G01C 23/00 (2006.01)

(52) U.S. Cl. .......................... 701/3; 701/200; 701/207; 701/208; 701/211

(58) Field of Classification Search .................. 701/3, 701/4, 9, 11, 14, 200–213; 340/988; 342/357.06–357.13
See application file for complete search history.

(56) References Cited

U.S. PATENT DOCUMENTS

| 5,225,842 | A | 7/1993 | Brown et al. |
| 5,715,163 | A | 2/1998 | Bang et al. |
| 5,839,088 | A | 11/1998 | Hancock et al. |
| 6,076,039 | A | 6/2000 | Kabel et al. |

OTHER PUBLICATIONS

Rudolph, F.M. et al., "NASA Contractor Report 182070, Diverter Decision Aiding for In-Flight Diversions". Lockheed Aeronautical Systems Company, Marietta, Georgia, 68 pages, Aug. 1990.

*Primary Examiner*—Richard M. Camby
(74) *Attorney, Agent, or Firm*—Klintworth & Rozenblat IP LLC

(57) ABSTRACT

A navigation system takes a graphical input and translates it into an alpha-numeric entry generally including latitude and longitude information. The system interprets the graphical entry, determines if a waypoint already exists or is depicted at the geographical location identified by the graphical entry and creates a new waypoint if no waypoint already exists or is depicted at the geographical location.

7 Claims, 6 Drawing Sheets

NAVIGATIONAL SYSTEM WITH A GRAPHICAL SCRATCHPAD FILLER

CROSS REFERENCE TO RELATED APPLICATION

This application claims priority to and is a divisional of U.S. patent application Ser. No. 11/069,420 filed Feb. 28, 2005, which is hereby incorporated by reference.

FIELD OF THE INVENTION

The invention generally relates to electronic data entry systems and specifically to electronic data entry systems with graphical scratchpad fillers for use in aircraft navigation systems.

BACKGROUND

Flight management in large commercial aircraft generally includes a flight management system (FMS). The FMS typically includes a central computer unit which integrates flight information and enables the pilot to manipulate flight information. Flight information may include, for example, aircraft position data, flight plan data, instrument approach information, and/or any other information which may pertain to flight management.

The FMS is generally connected to some sort of display unit, such as, for example, a central display unit (CDU), with which the FMS displays flight management information for use by the pilots. The CDU generally has an area on the screen which displays information prior to entry by the pilot called a scratchpad. The scratchpad displays characters as they are entered on a keyboard by the pilot. Thus, the pilot is able to check his/her data entry work prior to entry into the FMS.

For example, when interacting with a navigation system, the pilot generally enters any needed data into the FMS via the keyboard. Flight plan information generally includes, but is not limited to, waypoint and leg information. Waypoints are series of points that, when connected, identify a flight path. Therefore, modifications to the flight path (or flight plan) generally include modifications to and additions or deletions of waypoints and/or waypoint data. Waypoints may be pre-existing, pre-defined waypoints generally approved by some sort of authoritative body, such as the FAA, or the waypoints may be user defined. Waypoint information generally includes a waypoint name, an identifier code, and latitude and longitude information, among other items.

When the pilot needs to modify, add, and/or delete flight plan data, he/she generally enters waypoint information into the FMS and views the information on the scratchpad area of the CDU. The pilot generally must enter alpha-numeric characters of some sort to identify the waypoint. Another way to identify a waypoint is to define the new waypoint as a bearing and distance from an already defined waypoint. This method of waypoint identification also involves entering alpha-numeric characters into the scratchpad.

The process of determining waypoint information and entering it into the FMS via the CDU and alpha-numeric characters is both time consuming and requires considerable cognitive effort by the pilot.

The present invention is directed to overcoming one or more of the problems or disadvantages associated with the prior art.

SUMMARY

An aircraft navigational system with a graphical scratchpad filler is provided including a processor which runs a software program, an electronic display which displays navigational data, a flight management computer including a central display unit with a scratchpad area, and a cursor control device. The user may use the cursor control device to control a cursor on the electronic display and select points on the electronic display for entry into the scratchpad area of the central display unit.

A method of filling a scratchpad area on a central display unit is provided, including selecting a location on an electronic display with a cursor control device, converting the selected location to latitude and longitude coordinates, and comparing the latitude and longitude to a set of displayed points on the electronic display. Either the latitude and longitude or one of the points displayed on the electronic display may be sent to the scratchpad area on the central display unit.

The features, functions, and advantages can be achieved independently in various embodiments of the present invention or may be combined in yet other embodiments.

DETAILED DESCRIPTION

Figure 1:
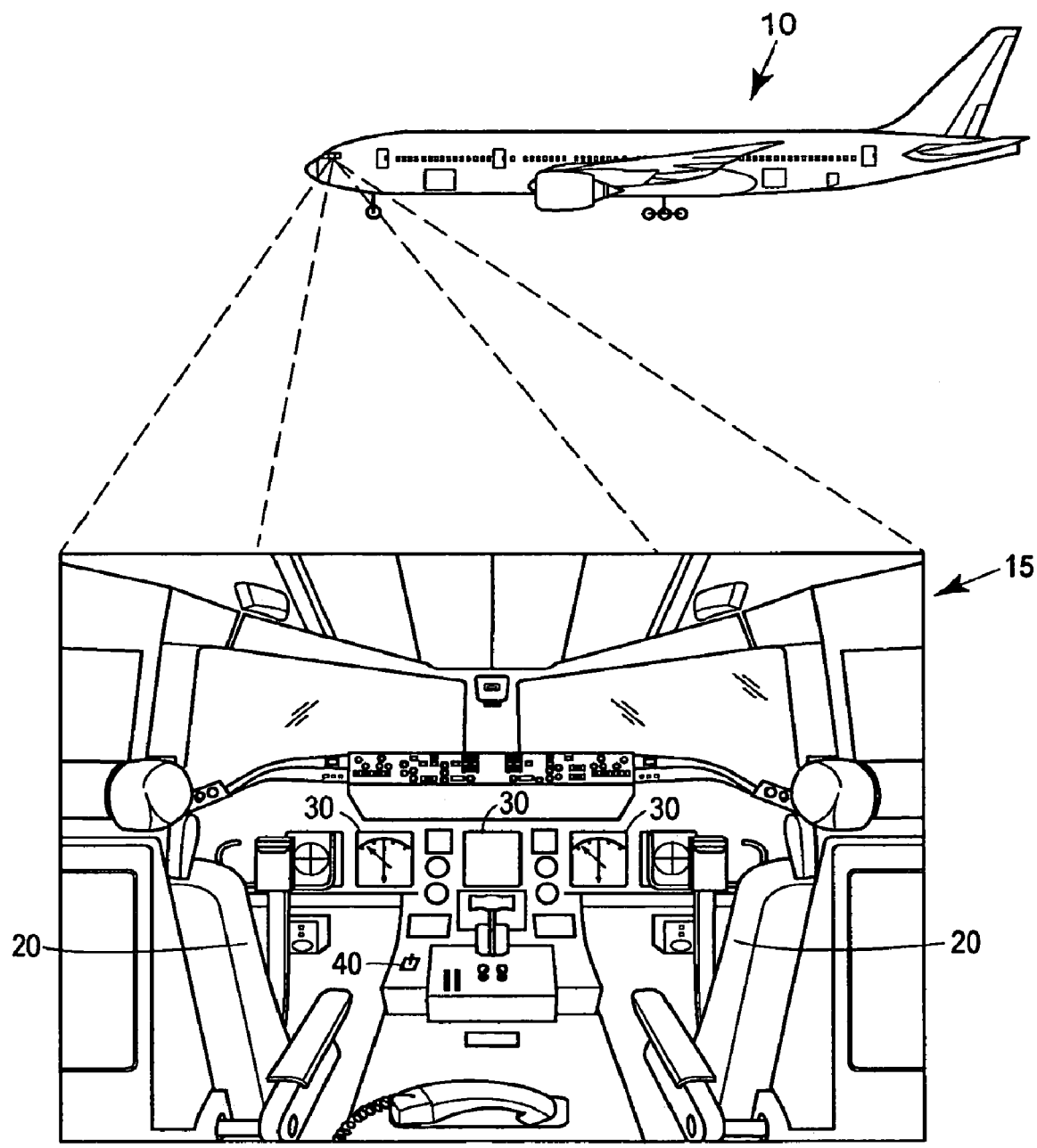
FIG. 1 shows an aircraft and a flight deck within the aircraft.

Turning now to FIG. 1, an aircraft 10 generally includes a flight deck 15 from which pilots may control the operation of the aircraft 10. The flight deck 15 may include stations 20 for one or more pilots, one or more electronic displays 30 and at least one cursor control device (CCD) 40.

Figure 2:
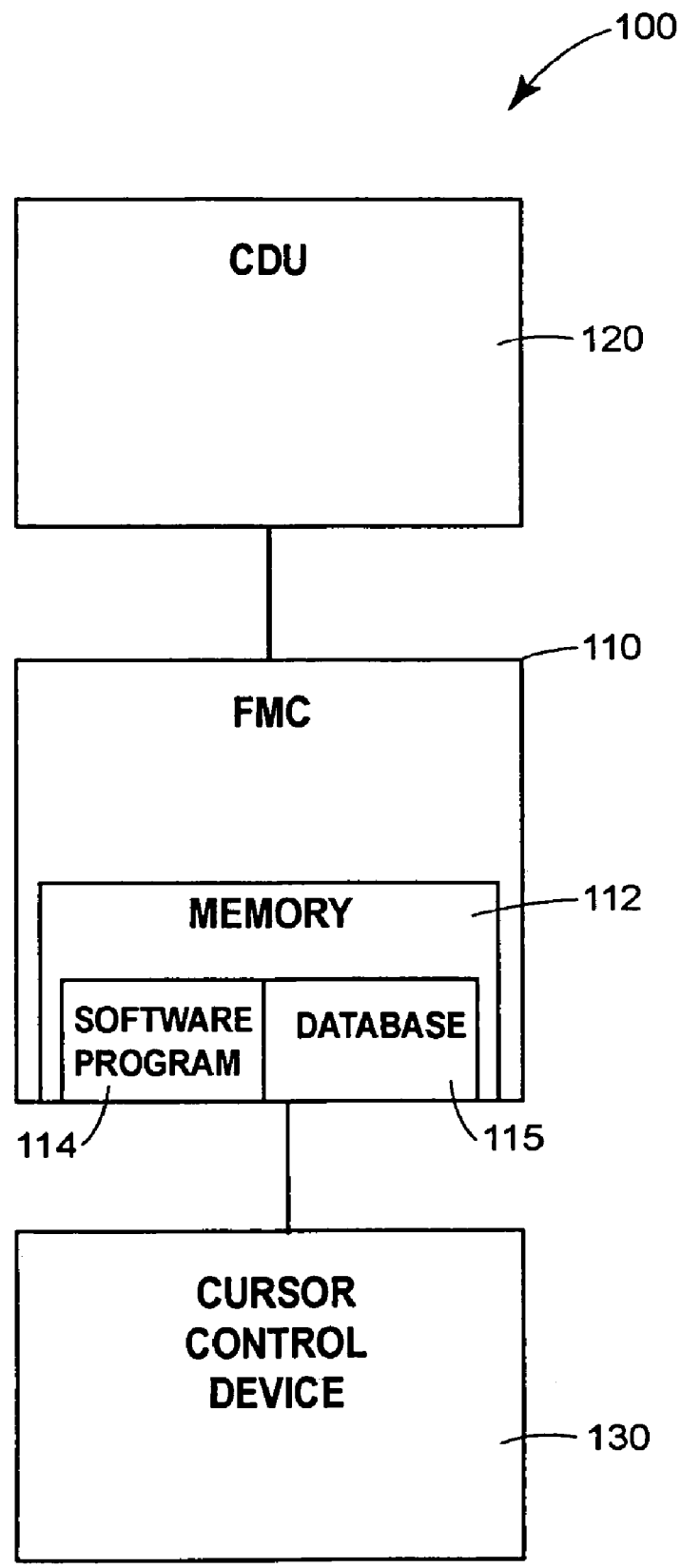
FIG. 2 is a schematic diagram of one embodiment of a graphical scratchpad filler.

FIG. 2 illustrates one embodiment of a graphical scratchpad filler 100. The graphical scratchpad filler 100 may be integrated with a flight management computer (FMC) 110 which may have a memory 112 containing a software program 114. The memory 112 may also include a database 115 which may include waypoint information. The FMC 110 may be operatively connected to a central display unit (CDU) 120 which may be an electronic display for displaying flight management information. The FMC 110 may also be operatively connected to the cursor control device (CCD) 40. The CCD 40 may enable the pilots to control a cursor on a navigational display for selection and entry of information into a scratchpad area 310 (FIG. 3) of the FMC 110.

Although the components of the graphical scratchpad filler 100 have been described with reference to aircraft systems, the components of the graphical scratchpad filler 100 may be more general in nature, for example, a computer of any sort could be substituted for the FMC 110 and an electronic display of any sort may be substituted for the CDU 120. Additionally, the electronic display may be, for example, a cathode ray tube (CRT) display, a liquid crystal display (LCD), a plasma display, a projection display, a touch screen display, or any other type of electronic display.

Figure 3:
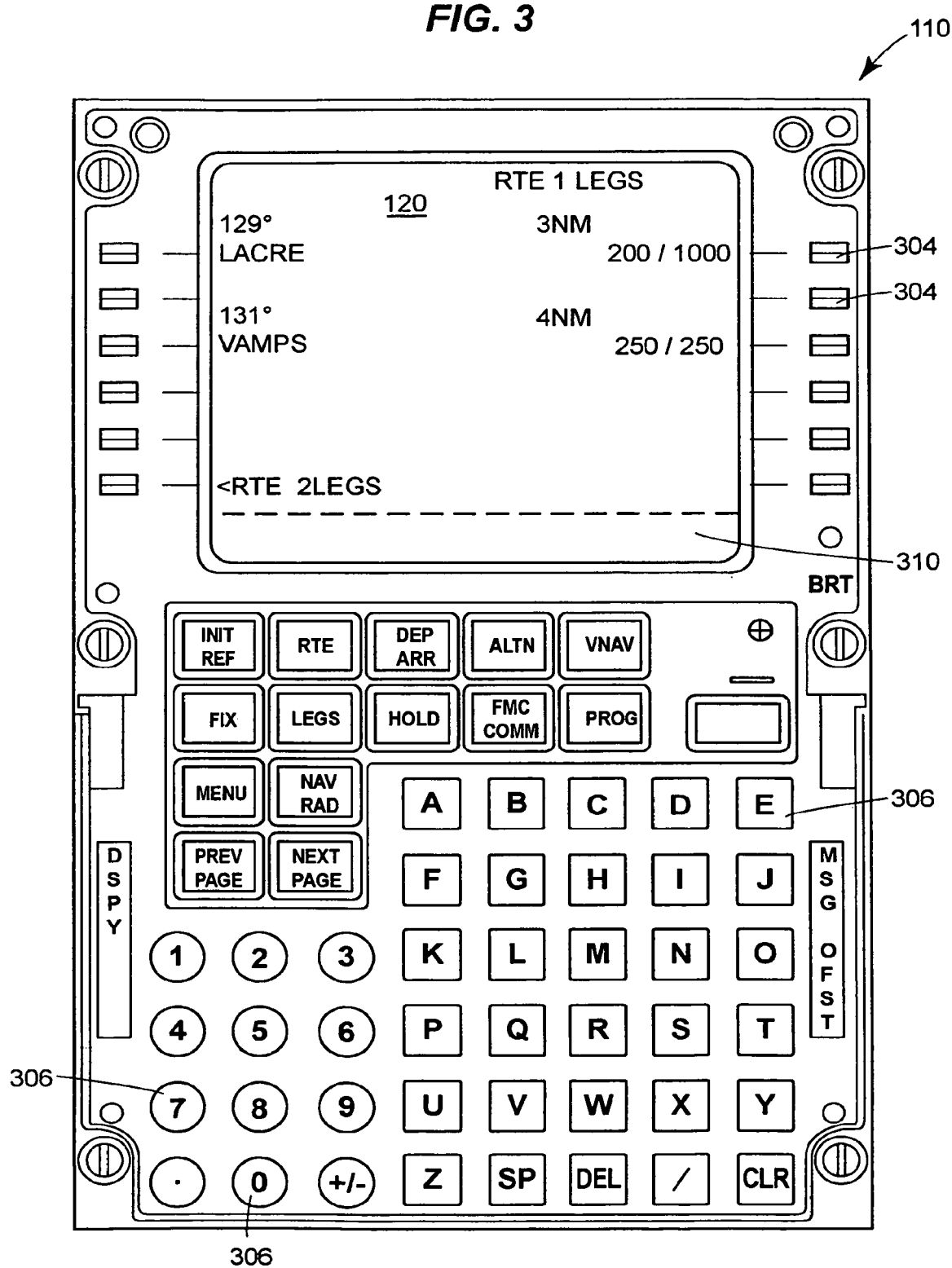
FIG. 3 is an example of a Flight Management Computer including a scratchpad area.

FIG. 3 depicts one embodiment of the FMC 110 that may be integrated with the graphical scratchpad filler 100 of FIG. 2. The FMC 110 may have a CDU 120 including a scratchpad area 310, line select keys 304 and entry keys 306. Generally, flight management information is displayed on the CDU 120 for reference and manipulation by the pilot. The pilot enters data into the FMC 110 via the line select keys 304 and the entry keys 306. The line select keys 304 may allow the pilot to select options or choices available on the CDU 120. If the pilot needs to enter data into the FMC 110, for example, new waypoint data, the data entry keys 306, which may represent alpha-numeric characters similar to a keyboard, may be used for data entry. When the pilot enters data via the entry keys 306 (and in some cases the line select keys), the entries appear in the scratchpad area 310, and this may allow the pilot to check his/her work prior to execution. Final entry of data from the scratchpad area 310 into the FMC 110 may be accomplished with an execute key or an enter key (neither shown), or by selecting one of the line select keys 304.

Figure 4:
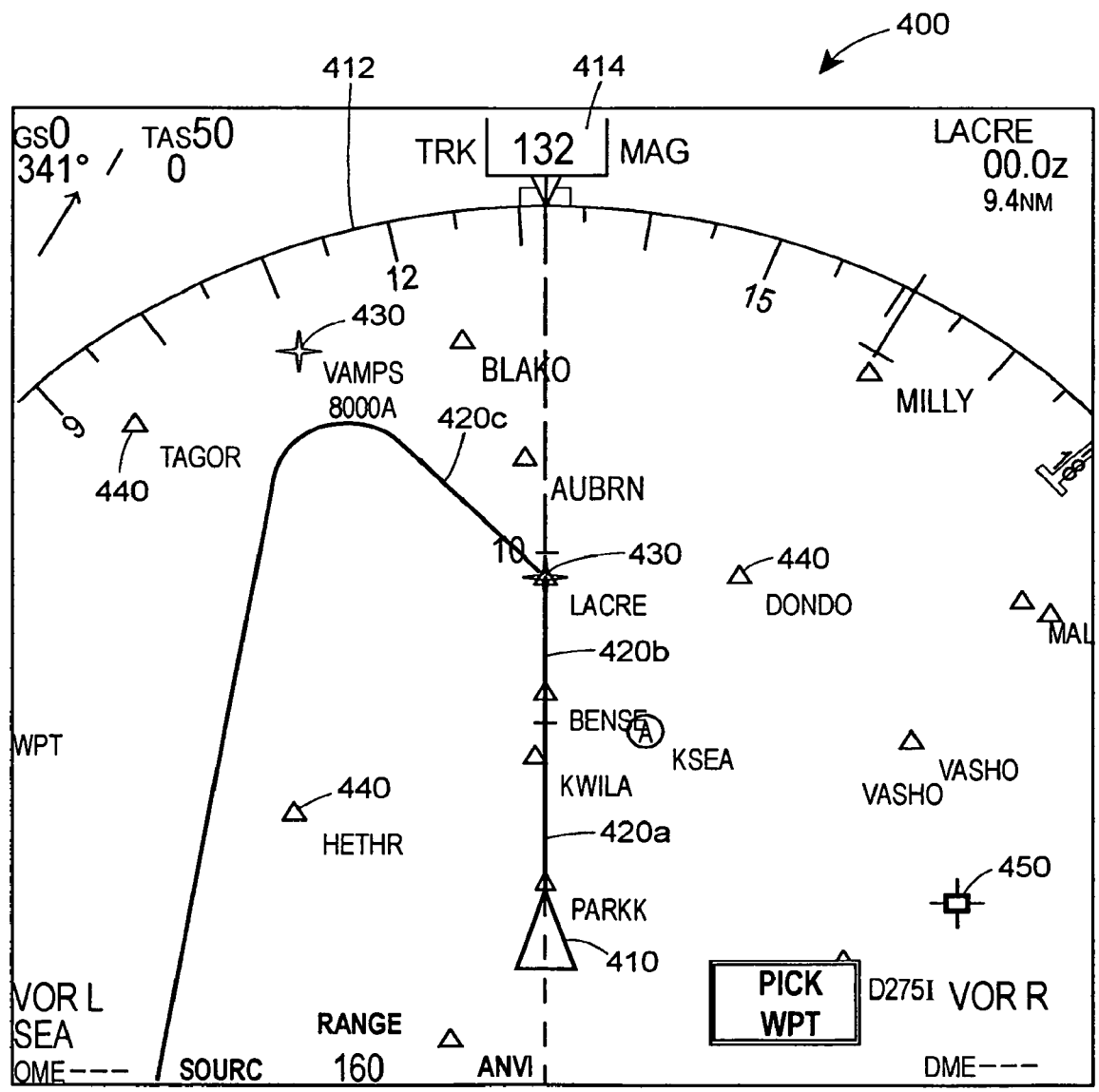
FIG. 4 is an example of a navigational display.

FIG. 4 is an example of a navigational display (ND) 400. The ND 400 may be any type of electronic display which displays positional information for an aircraft and/or flight plan information for the aircraft. The ND 400 may also include a partial compass rose 412 and an aircraft heading and/or track indication 414. An aircraft flight plan generally includes waypoints 430 and legs 420a, 420b, 420c which connect the waypoints. Additionally, different types of waypoints may be displayed, active waypoints 430 and background waypoints 440. The active waypoints are locations, identified by latitude and longitude, over or through which the aircraft 410 will pass and which identify points in the flight plan. In other words, the active waypoints 430 define the flight plan and the legs 420a, 420b, 420c connect those waypoints. Background waypoints 440 may also be displayed on the ND 400. Background waypoints 440 may be predefined waypoints contained within the database of the FMC 110. These background waypoints 440 may help the pilots change the flight plan in response to, for example, air traffic control instructions or weather deviations. Additionally, a cursor 450 may be displayed on the ND 400 and controlled by the CCD 40.

Figure 5:
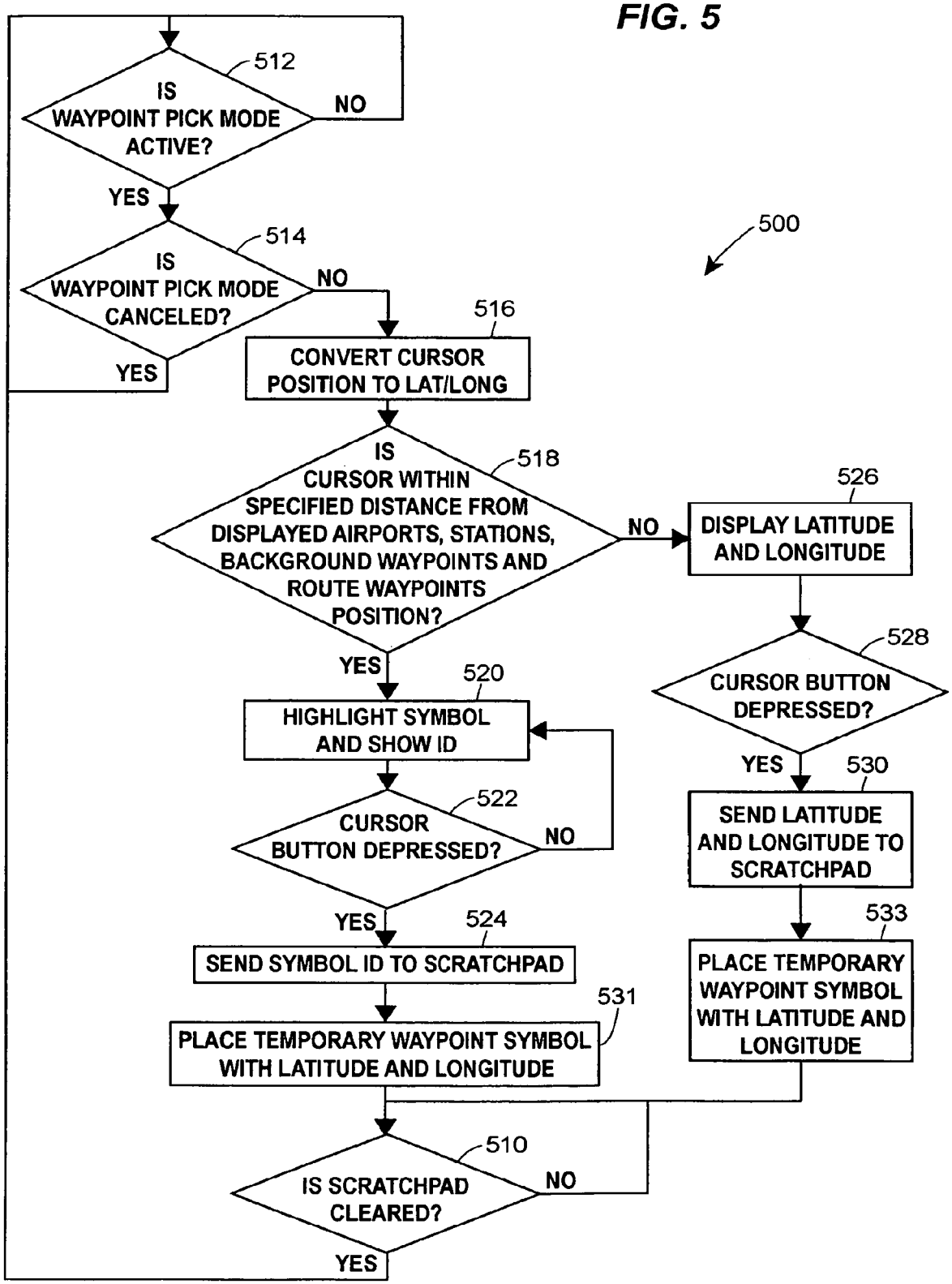
FIG. 5 is an example of one embodiment of a logic diagram illustrating how the software of the graphical scratchpad filler may operate.

FIG. 5 shows a logic diagram 500 illustrating a procedure which may be followed by the graphical scratchpad filler 100 embodied in FIG. 2. The graphical scratchpad filler may begin at 510 by determining whether the scratchpad area 310 on the CDU 120 (shown in FIG. 3) is empty, meaning there is no text currently displayed in the scratchpad area 310. If the scratchpad area is not empty, or is displaying text, the graphical scratchpad filler 100 may continue to monitor the condition of the scratchpad until the scratchpad is empty.

Once the graphical scratchpad filler 100 has determined that the scratchpad area 310 is empty, the graphical scratchpad filler 100 may then determine if a waypoint pick mode is active at 512. The waypoint pick mode may be a mode within the graphical scratchpad filler 100, selected by the user, which tells the graphical scratchpad filler 100 that the user is searching for a waypoint. If the waypoint pick mode is not active at 512, the graphical scratchpad filler 100 may continue to monitor the scratchpad area at 510 and the waypoint pick mode at 512. If however, the waypoint pick mode is active at 512, the graphical scratchpad filler 100 may then determine whether the waypoint pick mode has been cancelled at 514. If the waypoint pick mode has been cancelled at 514, the graphical scratchpad filler 100 may again monitor the scratchpad area at 510 and the waypoint pick mode at 512.

If the waypoint pick mode has not been cancelled at 514, the graphical scratchpad filler may convert the position of the cursor 450 on the ND 400 (FIG. 4) to a point defined by a latitude and a longitude. This conversion may be performed by using the Sodano Equation shown below:

$$NewLat = a\sin\left[(\sin(refLat) \times \cos\left(\frac{\sqrt{\Delta X^2 + \Delta Y^2}}{3444.053898}\right)\right) +$$

$$\cos(refLat) \times \left(\cos\left(aran\frac{\Delta X}{\Delta Y}\right)\right) \times \cos\left(\frac{\sqrt{\Delta X^2 + \Delta Y^2}}{3444.053898}\right)\right]$$

$$NewLong = \text{resolve to} + /-180$$

$$\left(refLong + (H \times a\cos\left(\frac{\cos\left(\frac{\sqrt{\Delta X^2 + \Delta Y^2}}{3444.053898}\right)}{\text{Cos}(refLat) \times (\cos(\text{Lat\_New}))}\right)\right)$$

Where:
New Lat is the latitude of the cursor point
New Long is the longitude of the cursor point
refLat is a reference latitude
refLong is a reference longitude
$\Delta X$ is the difference in the X direction between the reference point and the cursor position on the ND
$\Delta Y$ is the difference in the Y direction between the reference point and the cursor position on the ND This conversion may also be performed by any equivalent equation that projects a point on a sphere onto a plane.

After the graphical scratchpad filler 100 has converted the cursor position to a point of latitude and longitude at 516, the cursor may be checked at 518 to determine whether a displayed point, such as, for example, a waypoint, an airport, a NAVAID, a station, or any other displayed point, is located within a preset distance from the cursor location. In one embodiment, the preset distance is a 0.25 inch radius about the cursor 450. In this way, the user may effectively "filter" which points may be checked by selecting the appropriate level of detail on the ND 400. For instance, if the user would like to check for any background waypoints 440 which may allow him/her to modify the flight plan to avoid weather, the user may select background waypoints 440 for display on the ND 400 before selecting the waypoint pick mode. In this way, the background waypoints may be displayed on the ND 400 and be available for the graphical scratchpad filler 100 to check. Conversely, if the user would like to check for a diversion airport, he/she may select airports or stations for display on the ND 400 prior to selecting the waypoint pick mode on the graphical scratchpad filler 100. In this way, the user may selectively "filter out" unwanted data on the ND 400 and thereby speed up the selection process and ultimately the process of modifying the flight plan if desired.

If a displayed point is located within the preset distance of the cursor 450, the displayed point may be highlighted and the identification of the point shown on the ND 400 at 520. Identification of a point in aviation generally includes a one to seven letter code which uniquely identifies the point. The code may be stored in a database along with information specific about the point, such as, for example, latitude and longitude, point type (i.e. beacon, TACAN, VOR, VORTAC, airport, etc.), magnetic variation, servicing agency, frequency, or any other desired information about the point.

Figure 4A:
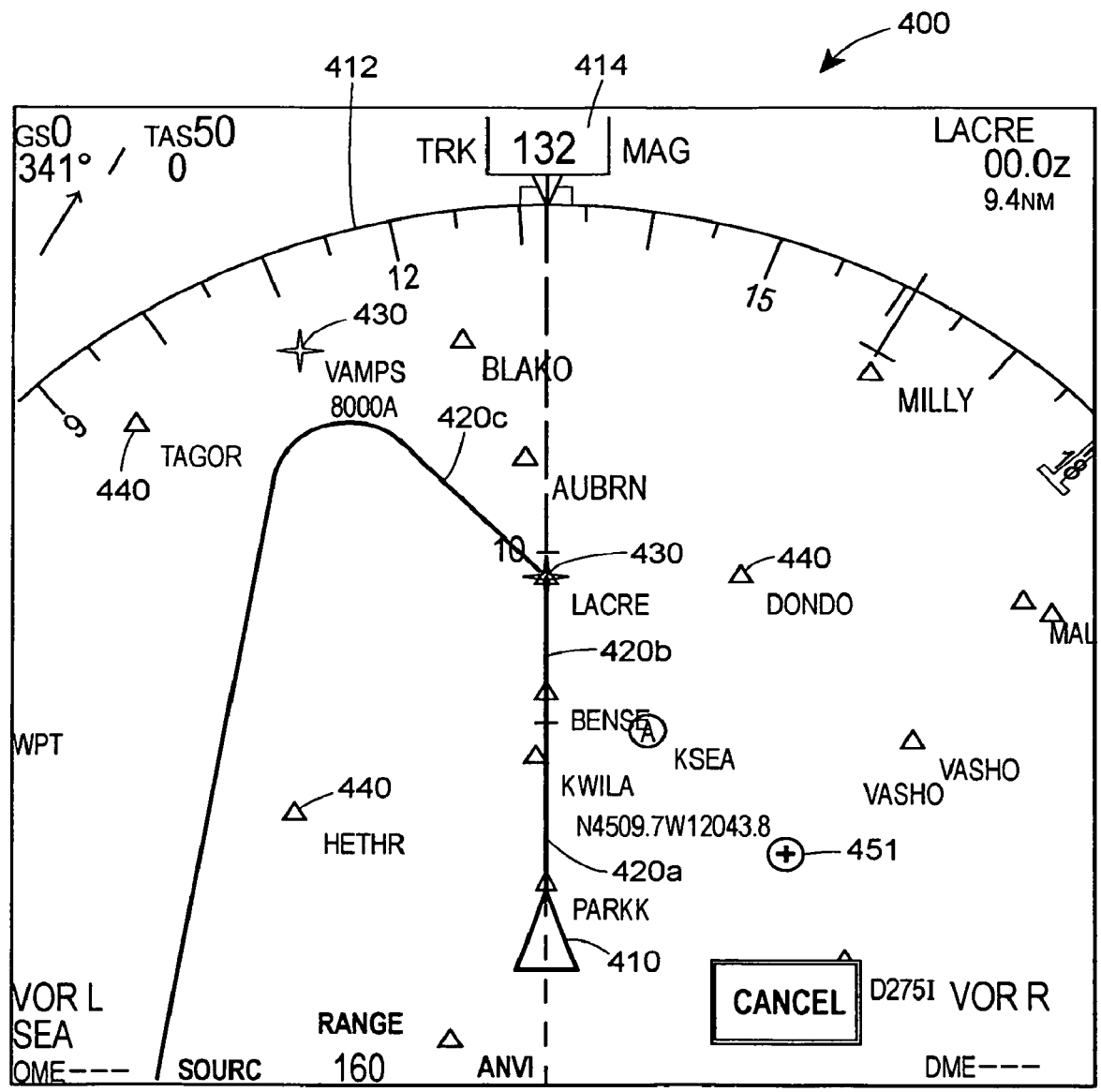
FIG. 4A is the navigational display of FIG. 4 showing a temporary waypoint symbol.

The user may select the highlighted displayed point on the ND 400 at 522 by activating the cursor control device 130 (FIG. 2). Once selected, the graphical scratchpad filler 100 may send the point identification (two to four letter code) to the scratchpad area 310 of the FMC 110 (FIG. 3) at 524 and place a temporary waypoint symbol 451 (FIG. 4A) on the ND 400 with the point identification at that location at 531. Once the data has been sent to the scratchpad area 310, the user may then modify the flight plan per normal operation of the FMC 110.

If, however, there is no displayed point on the ND 400 within the predefined distance of the cursor at 518, the graphical scratchpad filler 100 may display the latitude and longitude of the point (determined at 516) at 526. Once the latitude and longitude of the point is displayed at 526, the user may select this latitude and longitude at 528 by activating the cursor control device 130. If the user selects the latitude and longitude at 528, the latitude and longitude may be sent to the scratchpad area 310 of the FMC 110 at 530 and a temporary waypoint symbol 451 with the latitude and longitude may be placed on the ND 400 at the selected location at 533. Again, once the latitude and longitude is sent to the scratchpad area 310, the user may modify the flight plan per normal operation of the FMC 110.

Other aspects and features of the present invention can be obtained from a study of the drawings, the disclosure, and the appended claims.

We claim:

1. A method of filling a scratchpad area on a central display unit of a navigation system comprising:

selecting a location on an electronic display with a cursor control device;

converting the selected location to latitude and longitude coordinates;

comparing the latitude and longitude to a set of displayed points on the electronic display; and sending data representing either the latitude and longitude or one of the points displayed on the electronic display to the scratchpad area on the central display unit.

2. The method of claim 1 further including displaying a temporary waypoint symbol at the selected location on the electronic display.

3. The method of claim 2, wherein latitude and longitude information for the selected location is displayed on the electronic display proximate the temporary waypoint symbol.

4. The method of claim 2, wherein identification information for the selected location is displayed on the electronic display proximate the temporary waypoint symbol.

5. The method of claim 1, wherein the selected location is converted to latitude and longitude coordinates by using a Sodano Equation.

6. The method of claim 1, wherein the electronic display is one of a cathode ray tube (CRT), a liquid crystal display (LCD), a plasma display, and a projection display.

7. The method of claim 6, wherein the electronic display includes touch screen technology and a user controls the cursor by at least one of touching the electronic display and manipulating the cursor control device.

* * * * *